United States Patent [19]

Pittenger

[11] Patent Number: 4,504,110
[45] Date of Patent: Mar. 12, 1985

[54] CONVERGING BEAM LINEAR OPTICAL SCANNER

[75] Inventor: Robert L. Pittenger, Orange, Calif.

[73] Assignee: Rockwell International Corporation, El Segundo, Calif.

[21] Appl. No.: 496,145

[22] Filed: May 19, 1983

[51] Int. Cl.³ .................... G02B 27/17; G02B 17/00
[52] U.S. Cl. .................... 350/6.3; 350/1.3; 350/505
[58] Field of Search ............ 350/1.2, 1.3, 1.4, 6.3, 350/6.2, 6.1, 6.6, 505, 294, 412

[56] References Cited

U.S. PATENT DOCUMENTS

| | | | |
|---|---|---|---|
| 3,330,958 | 7/1967 | Kaisler et al. | 350/1.2 |
| 3,519,325 | 7/1970 | Abel et al. | 350/6.3 |
| 4,380,363 | 4/1983 | Fjeldsted | 350/1.3 |
| 4,411,499 | 10/1983 | Abel et al. | 350/412 |
| 4,427,259 | 1/1984 | Fjeldsted | 350/1.3 |
| 4,436,260 | 3/1984 | Donelan | 350/6.3 |

*Primary Examiner*—Jon W. Henry
*Attorney, Agent, or Firm*—H. Fredrick Hamann; James F. Kirk

[57] ABSTRACT

A converging beam linear optical scanning system comprising:
 an objective lens system for receiving essentially collimated light rays from object space and for converging the essentially collimated light rays along an optical axis to form a relatively flat image field on the relatively flat image plane; the optical axis of the objective lens system being incident on the relatively flat image plane;
 a meniscus lens having a vertex, the optical axis passing through the vertex, the meniscus lens being shaped to have essentially zero optical power;
 means for supporting and gimballing the meniscus lens on at least a first pivot axis, the first pivot axis being orthogonal to the objective lens optical axis and positioned to cross the optical axis between the objective lens and the image plane, the meniscus lens position being selected to have the meniscus lens receive the converging light rays from the objective lens system and to transmit the converging light rays to the relatively flat image plane;
 means for periodically and reciprocally oscillating the meniscus lens through a reciprocal predetermined pivotal angular displacement on at least the first pivot axis, the means for oscillating the meniscus lens being coupled to the means for supporting and gimballing the meniscus lens.

16 Claims, 12 Drawing Figures

CONVERGING BEAM LINEAR OPTICAL SCANNER

BACKGROUND OF THE INVENTION

1. Field of the Invention

This invention relates to lens systems for projecting an image onto a focal plane and more particularly to the field of optical scanning systems for periodically and reciprocally translating an image on an image plane between a first and second limit position while maintaining high image quality on a flat image plane. The invention optical scanning system is particularly adapted for use in light weight portable FLIR (Forward Looking Infrared) surveillance systems or imaging systems used for missile guidance and is typically employed with an objective lens system operating between the invention scanner and object space. The objective lens system is adapted to converge the light rays passing from object space, the light rays then passing through the invention scanner and being focused on a relatively flat image plan.

2. Description of the Prior Art

Various optical scanning systems are shown in the art for deflecting or scanning a scene image across an image plane or sensitive focal plane. These devices range from a simple mirror or refractive element rotating about an axis perpendicular to the optical axis of the system to other more sophisticated systems such as those using counter-rotating wedges as described in the "Fundamentals of Optics" by Jenkins and White, McGraw-Hill, 1957, pages 23 and 24. The counter-rotating wedge scanner is widely accepted in the optics field for applications requiring precise control of angle of deflection and beam control.

One problem associated with some optical scanning systems known in the art is that they translate the image on the image plane with a sinusoidal velocity on the image plane. This problem is overcome to some extent by optical scanning systems that utilize non-sinusoidal driving mechanizations. Counter-rotating wedge prism scanners are sometimes used to generate a straight line scan from a point light source. A disadvantage of the counter-rotating wedge prism scanner is that the counter-rotating wedge beam scanner wedges must be rotated in opposite direction with perfectly matched angular velocities. Variations in the respective angular velocities of each of the respective wedge prisms will result in a deflection error producing an orbital or elliptical motion of the image on the image plane.

Another problem associated with counter-rotating wedge beam scanners is the requirement for precision in the manufacture of the respective rotating wedges for those applications requiring relatively constant image velocity on the image plane. Another limitation of the counter-rotating wedge scanner when used to scan an image on an image plane with relatively constant image velocity on the image plane is low optical efficiency. As the wedges are counter rotated, the image translates on the image plane with a velocity varying as a sinusoidal function. To linearize the image velocity on the image plane, the application must restrict the usable range of the scan from typically minus thirty degrees to plus thirty degrees of prism rotation for each half cycle of prism rotation. The image, or the signals derived from the image on the image plane, are blanked or remain unused during the remainder of the counter-rotating wedge prism angle of rotation. The efficiency is therefore reduced by a factor defined by the ratio of blanking time to half cycle rotation time.

An oscillating flat mirror can be used with a lens system to form an optical scanning system; however, such systems require beam folding. Another prior art system of interest uses a rotating polygon having mirrored flat surfaces; however, such systems produce a focal point that describes an arc or ellipse as the polygon rotates.

SUMMARY OF THE INVENTION

It is a major objective of this invention to provide an optical scanning system having high optical efficiency. Another more particular objective of this invention is to minimize the number of parts used in its construction, thereby providing for increased reliability and reducing the cost of production.

These and other objectives of the invention are realized in a converging beam linear optical scanning system adapted to receive essentially collimated light rays from object space, the light rays passing through the objective lens system and converging beam linear optical scanning system in image forming relation to form an image on a relatively flat image plane. The converging beam linear optical scanning system is adapted to converge and focus the collimated rays and to periodically and reciprocally displace the converging light rays through a predetermined angle or pattern across the relatively flat image plane.

A preferred embodiment of the converging beam linear optical scanning system comprises an objective lens system for receiving essentially collimated light rays from object space and converging these essentially collimated light rays along an optical axis to form a relatively flat image field on the relatively flat image plane. The optical axis of the objective lens system is incident on the relatively flat image plane. The optical scanning system also includes a meniscus lens having a vertex. The optical axis passes through the vertex. The meniscus lens is shaped to have essentially zero optical power.

The converging beam linear optical scanning system also includes a means for supporting and gimballing the meniscus lens on at least a first pivot axis. The first pivot axis is orthogonal to the objective lens optical axis and is positioned to cross the optical axis between the objective lens and the image plane. The meniscus lens position is selected to have the meniscus lens receive the converging light rays from the objective lens system and to transmit the converging light rays to the relatively flat image plane. A means for periodically and reciprocally oscillating the meniscus lens through a reciprocal predetermined pivotal angular displacement on at least the first pivot axis is included. The means for oscillating the meniscus lens is coupled to the means for supporting and gimballing the meniscus lens. The image is thereby periodically and linearly displaced on the relatively flat image plane, the linear displacement corresponding in range and time to the meniscus oscillating first pivotal angle on the first pivot axis.

DESCRIPTION OF THE DRAWINGS

The invention will be further described as to an illustrative embodiment thereof in conjunction with the attached drawings in which.

DESCRIPTION OF THE PREFERRED EMBODIMENT

Figure 1:
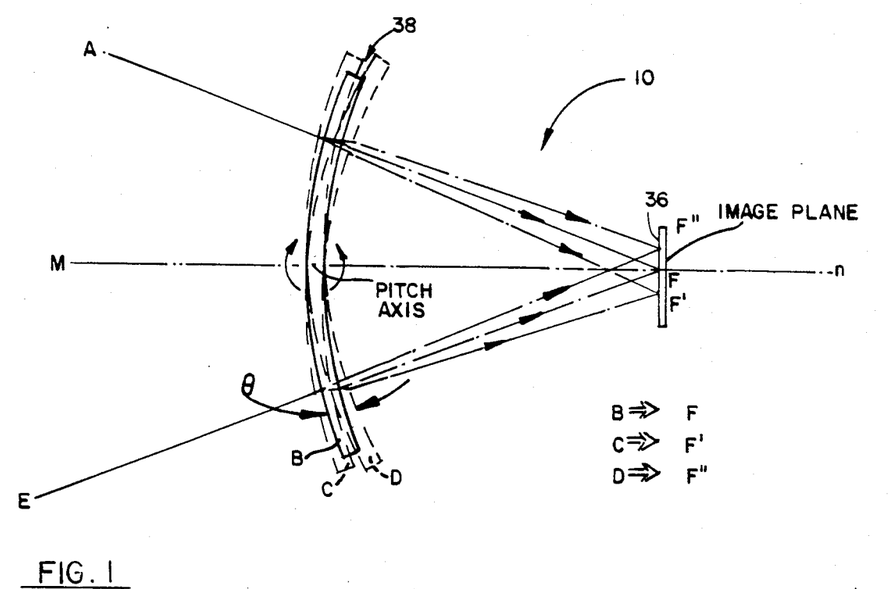
FIG. 1 is a plan elevation view of the converging beam linear optical scanner.

FIG. 1 shows a converging beam linear scanner 10 comprising a meniscus lens 38 adapted to receive converging light rays A, M, and E from an objective lens 2 (not shown), the light rays passing through the meniscus lens 38 in image forming relation, i.e., the rays being conditioned to form an image on image plane 36. The meniscus lens 38 is periodically and reciprocally oscillated lens through a reciprocal predetermined pivotal angular displacement such as through plus and minus angle on the pivot axis. The meniscus lens 38 is shown at a reference position B and in phantom at pivotal angular displacement positions C and D. Rays such as A and E pass through the lens when in reference position B and focus at point F on image plane 36. Rays, such as A and E pass through the lens, when in position C and focus on the image plane 36 at point F'. Rays, such as A and E pass through the lens, when in position D and focus on the image plane 36 at point F''.

Figure 2:
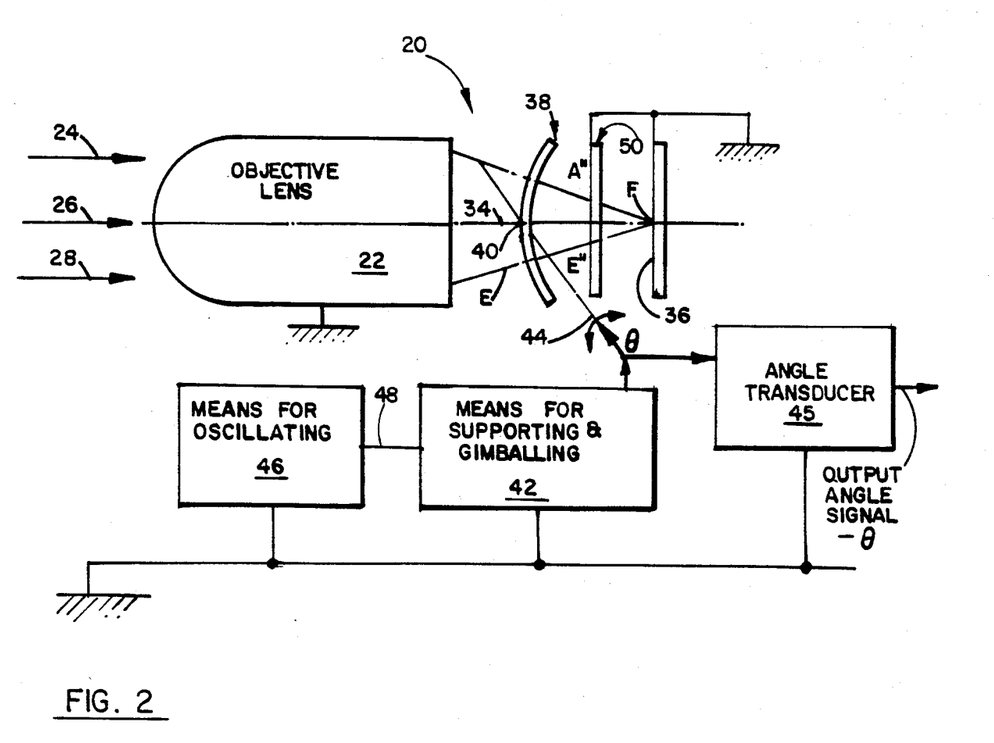
FIG. 2 is a block diagram of the invention optical scanning system.

FIG. 2 shows a block diagram of the invention converging beam optical scanning system 20 having an objective lens system represented by block 22 for receiving essentially collimated light rays 24, 26, 28 from object space 32 (not shown) and converging the essentially collimated light rays along an optical axis 34 to form a relatively flat image field. The objective lens block 22 is adapted to form a relatively flat image field on the relatively flat image plane 36. A meniscus lens 38 having vertex 40 is shown between block 22 and the image plane. Optical axis 34 passes through vertex 40. The meniscus lens 38 is typically shaped to have essentially zero optical power. A means for supporting and gimballing the meniscus lens 38 on at least a first pivot axis represented by block 42 and would typically consist of a lens mount or housing containing trunions to which are attached bearings, rotating spring pivots, or similar rotational devices, which in turn are typically supported by a means housing or structure. Block 42 is positioned to orientate the meniscus lens first pivot axis 44 to be orthogonal to the objective lens optical axis 34 and to position the meniscus lens 38 between the objective lens 22 and the image plane 36. The meniscus lens position is selected to have the meniscus lens 38 receive the converging light rays A' and E' from the objective lens system 22 and to transmit the converging light rays A'', E'' to the image plane 36.

An alternative gimbaling means is intended to include a second pivot axis orthogonal to both the first pivot axis and the objective lens optical axis; this second pivot axis also passing through the intersection of the first pivot axis and the objective lens optical axis. This alternate gimbaling means is meant to include a gimbal ring or structure that mechanically defines both orthogonal pivot axes and houses and supports portions of the pivoting means. The gimbal ring or structure also includes means of transmitting rotational motion to the inner pivot axis from a driving means remote to the gimballing means, or located on the gimbal ring or structure means. This alternate gimbal means allows the meniscus lens 38 to be moved in two orthogonal axes and thus direct the converging light rays A'', E'' to the image plane 36 such that the focal point F can be translated across the image plane 36 in any line or pattern. The scan pattern can be linear, circular, square, raster, rosette, spiral, or any other pattern for which equations can be written in terms of motion about two orthogonal axes on a single flat plane.

Block 46 represents a means for periodically and reciprocally oscillating the meniscus lens 38 on at least the first pivot axis. The means for oscillating the meniscus lens is coupled by magnetic, electromagnetic, or mechanical means such as gears, cam follower, push rods, yokes, shafts, etc., or by signal line 48 to Block 42. Signal line 48 is adapted to carry the signed information necessary to actuate a driving device in Block 42, such as a torque motor, piczoelectric device "follow up" synchro, solenoid, etc. (especially when two pivot axes are involved. Converging light rays such as A'' and E'' pass from the meniscus lens '' through dewar window 50 and focus on the relatively flat image plane 36 at point F. Block 46 includes conventional power amplifiers, algorithms, and electronic circuitry that generates the electrical signals that characterize the scan pattern desired on image plane 36. Thus, the the image is periodically and linearly displaced on the relatively flat image plane 36 in response to a signal from the means for periodically and reciprocally or periodically oscillating the meniscus lens, i.e. block 46, in cooperation with the driving the means for supporting and gimballing the meniscus lens, i.e. block 42, on the first pivot axis, such as axis 44 through a periodically reciprocating pivotal angle on pivot axis 44. Angle Transducer block 45 is provided to provide an output angle signal to describe the angle position of the scanner to systems receiving image plane information.

Figure 5:
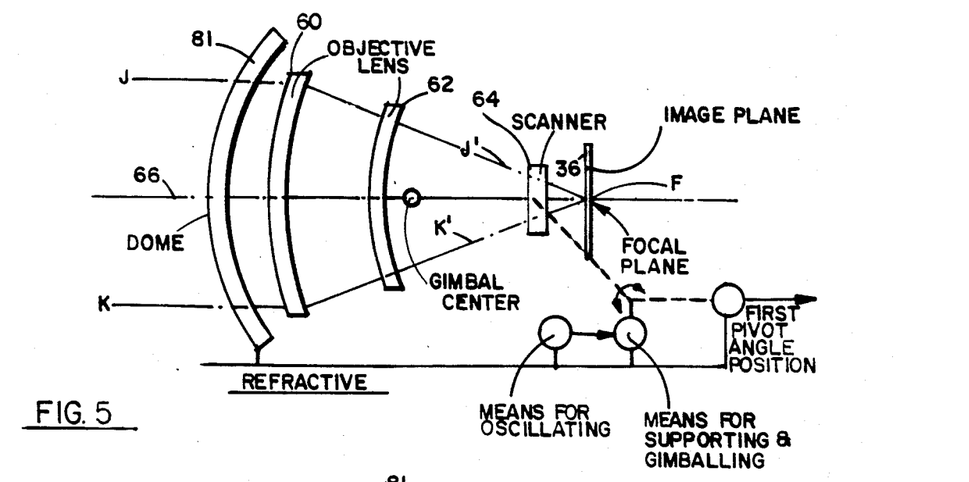
FIG. 5 is a simplified plan elevation view of a refractive objective lens operating to the left of a scanner.
Figure 6:
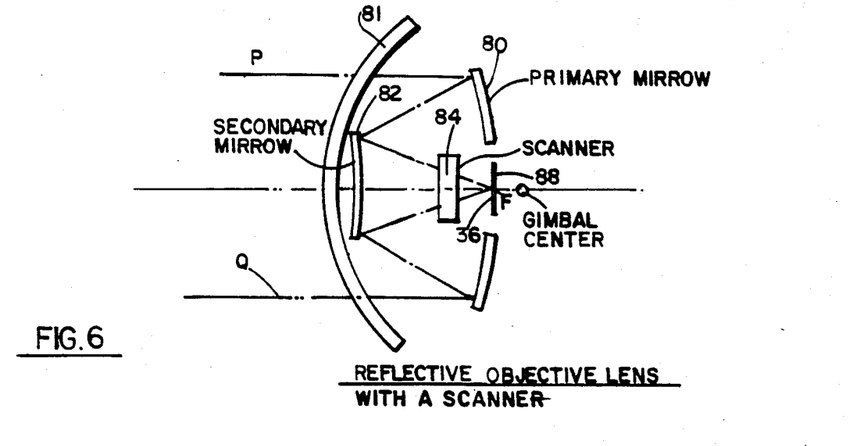
FIG. 6 is a simplified plan elevation view of a reflective objective lens operating with a scanner.
Figure 7:
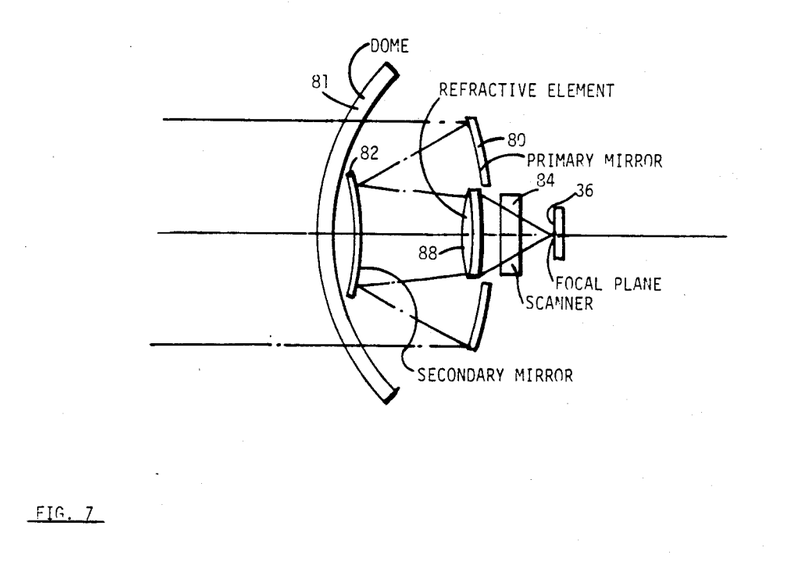
FIG. 7 is a simplified plan elevation view of an optical scanning system using a catadioptric objective lens system operating with a scanner.

Block 22, representing the objective lens, does not characterize the objective lens as to its type. FIGS. 5, 6 and 7 each respectively depict an alternative embodiment of the invention optical scanning system, each using an objective lens of a different type. FIG. 5 shows the optical scanning system using a refractive objective lens comprising lens elements 60 and 62 receiving collimated light rays J, K from object space (not shown). The objective lens elements 60, 62 converge the light rays J and K along optical axis 66 as rays J' and K' to optical scanner 64 to focus on relatively flat image plane 36 at point F. Optical scanner 64 is meant to comprise a meniscus lens 38, a means for supporting and gimballing the meniscus lens such as block 42, and a means for oscillating such as block 46 as described in FIG. 2 above.

FIG. 6 depicts another alternative embodiment of the invention optical scanning system using an objective lens of the reflective type comprising lens elements 80 and 82 receiving light rays P and Q from object space (not shown). Light rays P, Q are converged through optical scanner 84 and focused at point F on the relatively flat image plane 88. Optical scanner 84 is meant to include meniscus lens, such as 38, a means for supporting and gimballing the meniscus lens such as block 42 and a means for oscillating the meniscus lens such as block 46 on a first pivot axis, such as 44, as described in FIG. 2 above.

Figure 3:
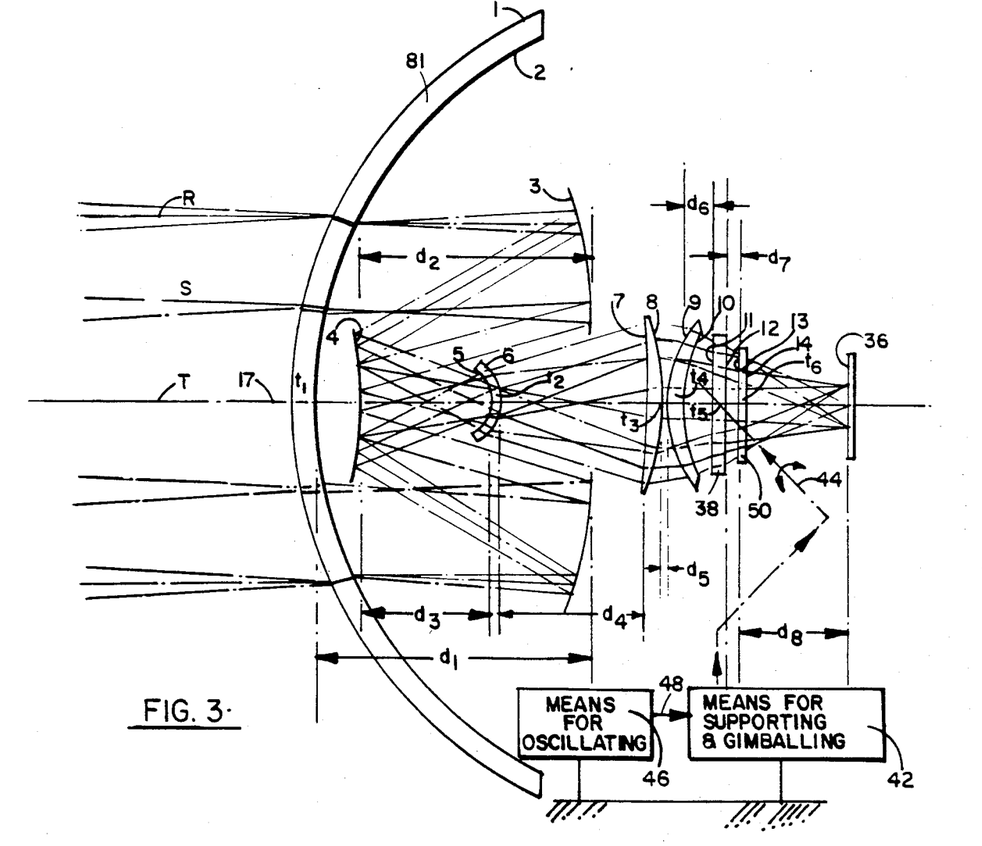
FIG. 3 is a plan elevation view of the Preferred Embodiment of the invention Converging Beam Linear Optical Scanning System using a catadioptric objective lens.
Figure 4:
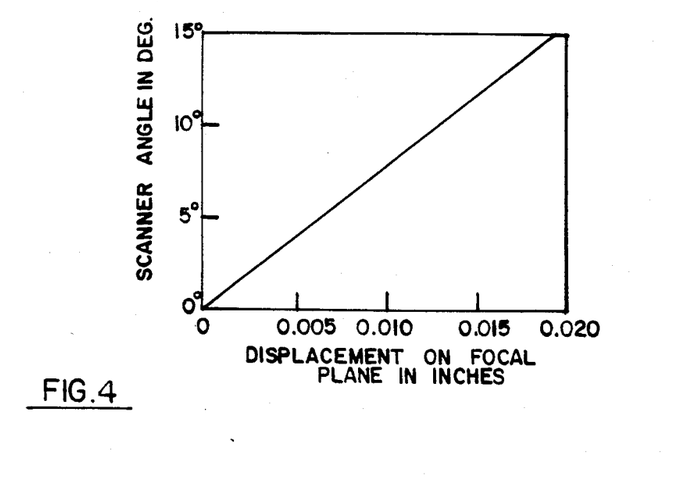
FIG. 4 is a graph depicting the relationship between scan angle and displacement of the image on the focal plane.

FIG. 3 depicts a preferred alternative embodiment of the invention converging beam optical scanning system, using an objective lens of the catadioptric type. A prescription is provided below in Table 1 for the preferred alternative embodiment of FIG. 3. The first column represents the lens element surface of interest. The second column names the surface under REMARK. The third column shows the radius of curvature of the particular surface identified by number in the first column. The fourth column characterizes the thickness of the respective lens element in inches. The distance between respective lens element verticies also appears in the fourth column, these distances also being measured in inches. The fourth column characterizes the asphericity, where applicable and the sixth column indicates the material from which the respective lens element is fabricated.

The first element of FIG. 3 is the dome having surfaces 1 and 2, each surface having a positive radius of curvature of 3.500 inches. These surfaces are spherical. The thickness of the dome is shown in the table as $t_1$ and is 0.20 inches. The material is zinc sulfide.

Collimated light rays R, S, T pass from object space 32 (not shown) to the dome surface 1. The light rays exit the dome's surface 2 and pass to the primary mirror surface 3 to be reflected to secondary mirror surface 4, there to be reflected to field lens first surface 5.

The second row of Table 1 shows the distance between the inner vertex of the dome and the vertex of the primary mirror to be $d_1$ and equal to 2.48 inches. Row three shows the primary mirror surface having a negative radius of curvature of 5.600 inches. The distance $d_2$ equal minus 2.100 inches and is measured from the vertex of the primary mirror to the vertex of the secondary mirror surface 4. The secondary mirror surface 4 is has a negative radius of curvature of 8.041 inches. The distance $d_3$ equal 1.163 inches is measured from the vertex of the secondary mirror to the vertex of field lens surface 5. Light passes through the field lens from surface 5 to surface 6 and then to surface 7 of reimager lens 1. Field lens surface 5 has a negative radius of curvature of −0.316 inches and a thickness $t_2$ equal 0.08. Field lens surface 6 has a negative radius of curvature of 0.363 inches. The distance $d_4$ is measured between field lens surface 6 vertex and reimager 1 lens surface 7 vertex and is equal to 1.279 inches. The reimager 1 lens surface 7 has a negative radius of curvature of −12.856 inches and a thickness $t_3$ equal 0.12 inches. Reimager 1 lens surface 8 has a negative radius of curvature of −3.368 inches. The vertex of lens surface 8 is located at a distance $d_5$ equal 0.04 inches from the vertex of reimager 2 lens surface 9 vertex. Reimager 2 lens surface 9 has a radius of curvature of 1.065 inches and a thickness $t_4$ equal 0.12 inches. The reimager 2 lens surface 10 has a radius of curvature of 1.235 inches and its vertex is located at distance $d_6$ equal 0.250 inches from scanner lens surface 11 vertex 40.

The scanner lens surface 11 is the first surface of a meniscus lens having a vertex 16 and a radius of curvature of 8.350 inches. The scanner has a thickness $t_5$ equal 0.10 inches. The scanner second surface 12 has a radius of curvature of 8.000 inches and is located at a distance $d_7$ equal 0.15 inches from dewar window surface 13. The dewar window 13 has a thickness $t_6$ equal 0.04 inches. The second inner surface of the dewar window 14 is located at a distance $d_8$ equal 0.923 inches from relatively flat focal plane surface 15.

Block 42 represents a means for supporting and gimballing the scanner, the scanner typically being a meniscus lens having a vertex 40 and an optical axis passing through the vertex 40. The means for supporting and gimballing the meniscus lens is meant to include all conventional means including a frame for holding and positioning the lens in relation to a shaft and bearing system (not shown) providing a first pivot axis such as 44, the first pivot axis 44 being orthogonal to the optical axis 17. The primary, secondary, field lens, reimager lenses 1 and 2 form an objective lens having optical axis 17. The meniscus lens surface 11 receives converging light rays from the objective lens system. The light rays are then transmitted from meniscus lens surface 12 through the dewar window having surfaces 13 and 14 to the relatively flat image plane surface 36.

Block 46 represents a conventional means for oscillating the meniscus lens on the pivot axis 44 through a reciprocal predetermined pivotal angular displacement. The means for oscillating the meniscus lens is shown coupled to Block 42 by signal path 48. The means for oscillating is meant to include conventional oscillator circuits providing adapted buffered signals to conventional motors and also means such as a motor operating at relatively constant speed and oscillating the meniscus lens by a conventional cam and cam follower arrangement.

The converging beam optical scanning system of FIG. 3 has a dome having surfaces 1 and 2 fabricated from material chosen to be transparent in the infrared spectrum, the material typically being zinc sulfide, ZnS. The primary and secondary mirror surfaces 3 and 4 are typically formed of high reflective gold on a substrate. The field lens having surfaces 5 and 6, the reimager 1 and 2 lenses having surfaces 7, 8 and 9, 10 are typically fabricated from optical quality germanium. The scanner, a thin meniscus lens having surfaces 11 and 12 is typically fabricated from zinc selinide, ZnSe. The dewar window having surfaces 13 and 14 is typically fabricated from sapphire, $Al_2O_3$ or ZnS.

TABLE 1

| SURFACE MATERIAL | REMARKS | RADIUS (INCHES) | THICKNESS ($t_n$) and SPACING ($d_m$) (INCHES) | ASPHERICITY | |
|---|---|---|---|---|---|
| 1 | DOME | 3.500 | $t_1 = 0.20$ | | ZnS |

TABLE 1-continued

| SURFACE MATERIAL | REMARKS | RADIUS (INCHES) | THICKNESS ($t_n$) and SPACING ($d_m$) (INCHES) | |
|---|---|---|---|---|
| 2 | DOME | 3.500 | $d_1 = 2.48$ | |
| 3 REFLECTOR | PRIMARY | −5.600 | $d_2 = -2.100$ | −0.7465 |
| | | | | CONIC CONSTANT |
| 4 REFLECTOR | SECONDARY | −8.041 | $d_3 = 1.163$ | 7.67E-3 |
| | | | | 4th ORDER |
| 5 GERMANIUM | FIELD LENS | −0.316 | $t_2 = 0.08$ | |
| 6 | | −0.363 | $d_4 = 1.279$ | |
| 7 GERMANIUM | REIMIGER 1 | −12.856 | $t_3 = 0.12$ | |
| 8 | | −3.368 | $d_5 = 0.04$ | |
| 9 GERMANIUM | REIMIGER 2 | 1.065 | $t_4 = 0.12$ | |
| 10 | | 1.235 | $d_6 = 0.250$ | |
| 11 | SCANNER | 8.350 | $t_5 = 0.10$ | ZnSe |
| 12 | | 8.000 | $d_7 = 0.15$ | |
| 13 | DEWAR | -0- | $t_6 = 0.04$ | |
| 14 | WINDOW | -0- | $d_8 = 0.923$ | |
| 15 | IMAGE PLANE | -0- | | |

Figure 8A:
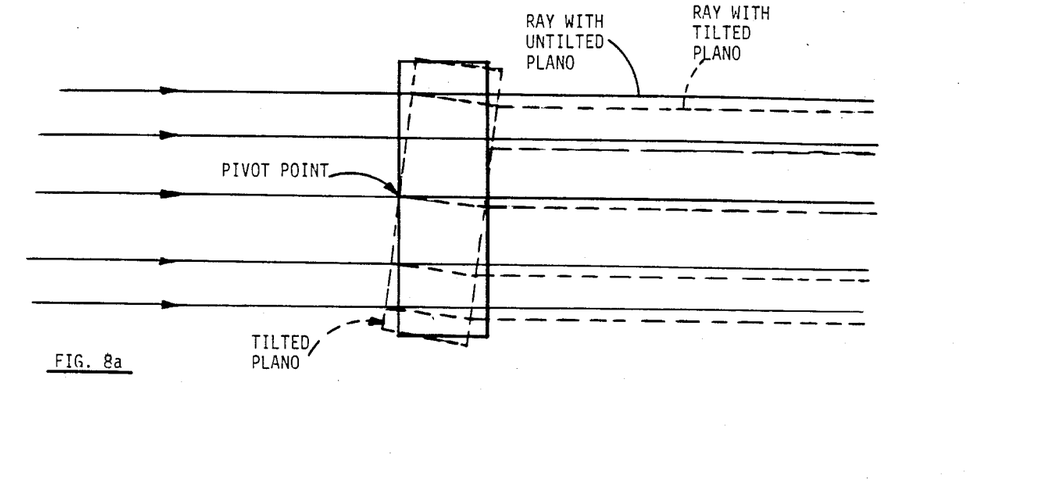
FIG. 8a is a transmissive plano parallel plate in a collimated light beam.

The performance of the meniscus lens in a converging beam can be understood by first considering the effect of a tilted transmissive plano parallel plate (window) of fixed index of refraction and thickness placed in a beam of parallel rays and initially aligned perpendicular to the rays. Refer to FIG. 8a. Tilting the window, or plate, as shown in phantom, causes the beam of parallel rays to be linearly displaced parallel to the optical axis by an amount commensurate with the angle or tilt. Since there is no optical power in the plano parallel plate and all incident angles are the same, there will be no divergence or convergence of the collimated beam exiting the transmissive plate.

Figure 8B:
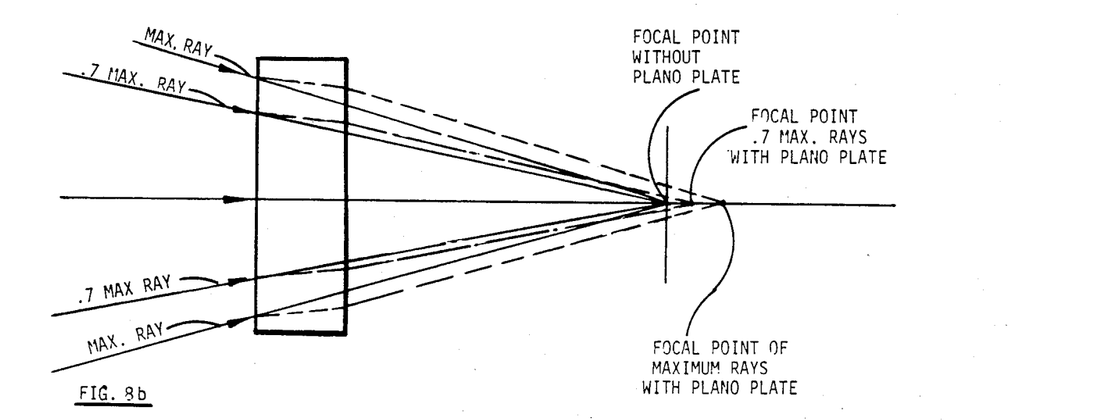
FIG. 8b is an untilted transmissive plano parallel plate in a converging beam.

Referring now to FIG. 8b, the same tiltable transmissive plano parallel plate is placed in a converging beam with surfaces of the plate initially aligned perpendicular to the optical axis. The entrance angle of each individual ray varies across the converging beam. The figure shows that in accordance with Snell's Law, each ray exits the last surface of the plano parallel plate parallel to the ray as it would have travelled before the plano parallel plate was inserted, but slightly displaced radially from the optical axis, to its entrance angle. As a result of this displacement, the rays cross the optical axis at points located some significant distance further away, i.e., to the right of the initial focus. This results in the image being somewhat blurred in a manner similar to spherical aberrations.

Figure 8C:
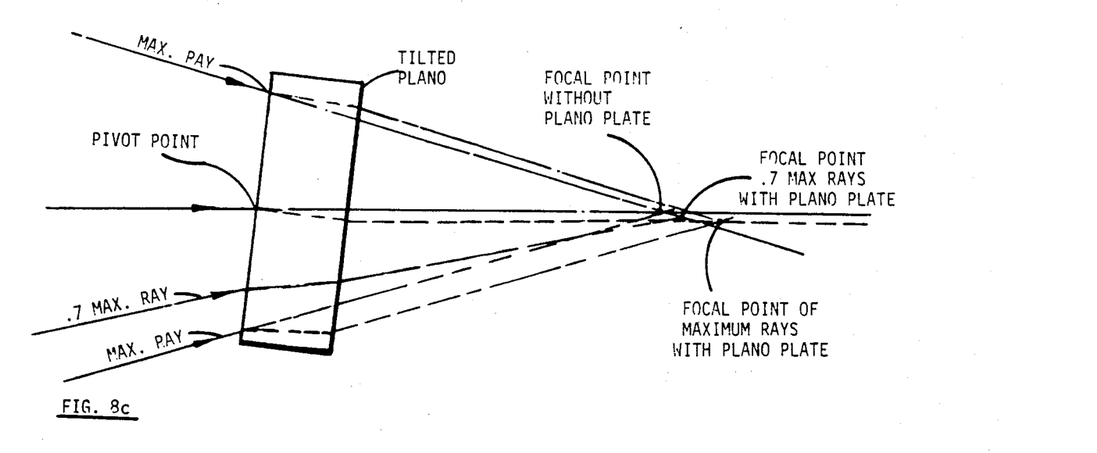
FIG. 8c is a tilted transmissive plano parallel plate in a converging beam.

As depicted in FIG. 8c, when the transmissive plano plate is tilted about a horizontal axis, the resulting image becomes additionally blurred because each converging ray impinges on the plano window at different and larger entrance angles. FIG. 8c shows the rays exiting at these different angles and converging off the optical axis at many different points near the focal point. Off-axis rays from the wide field of view scene are dispersed even more resulting in additional blurring.

Figure 9:
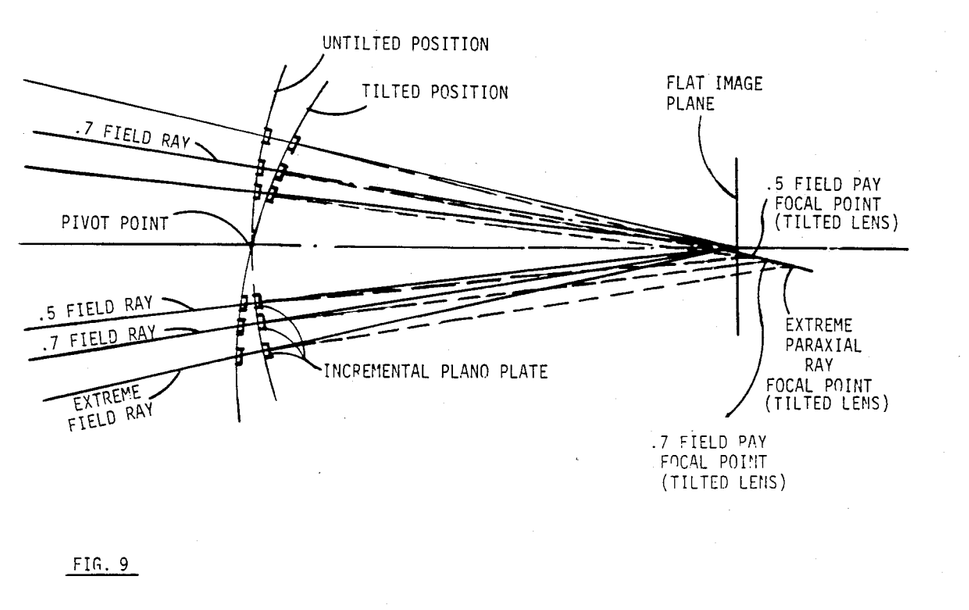
FIG. 9 is a schematic drawing illustrating an infinite number of incremental plano parallel plates arrayed on a curved surface to simulate a meniscus lens.

FIG. 9 shows the operation of an infinite number of very small transmissive plano parallel plates oriented so that the parallel surfaces of each one are initially aligned perpendicular to the respective converging ray that impinges on and passes through them. Each incremental plano plate and its respective ray now perform like a plano plate in a collimated beam. If these very small or incremental plano plates are made sufficiently numerous and are connected together (as shown by the dotted lines in FIG. 9) they form a meniscus lens having a front surface with a radius of curvature equal to the distance to the focal point. Tilting the meniscus lens formed by the continum of incremental transmissive plano parallel plates operates to cause the respective ray that exits from the last surface of each tilted incremental plano parallel plate to continue on a path that is parallel, but displaced linearly and radially from the path that is parallel to the path of the ray prior to its entering the respective plano plate. In the invention optical scanning system, the meniscus lens formed by these incremental plano plates is tilted about a pivot point on the objective lens optical axis.

Figure 10:
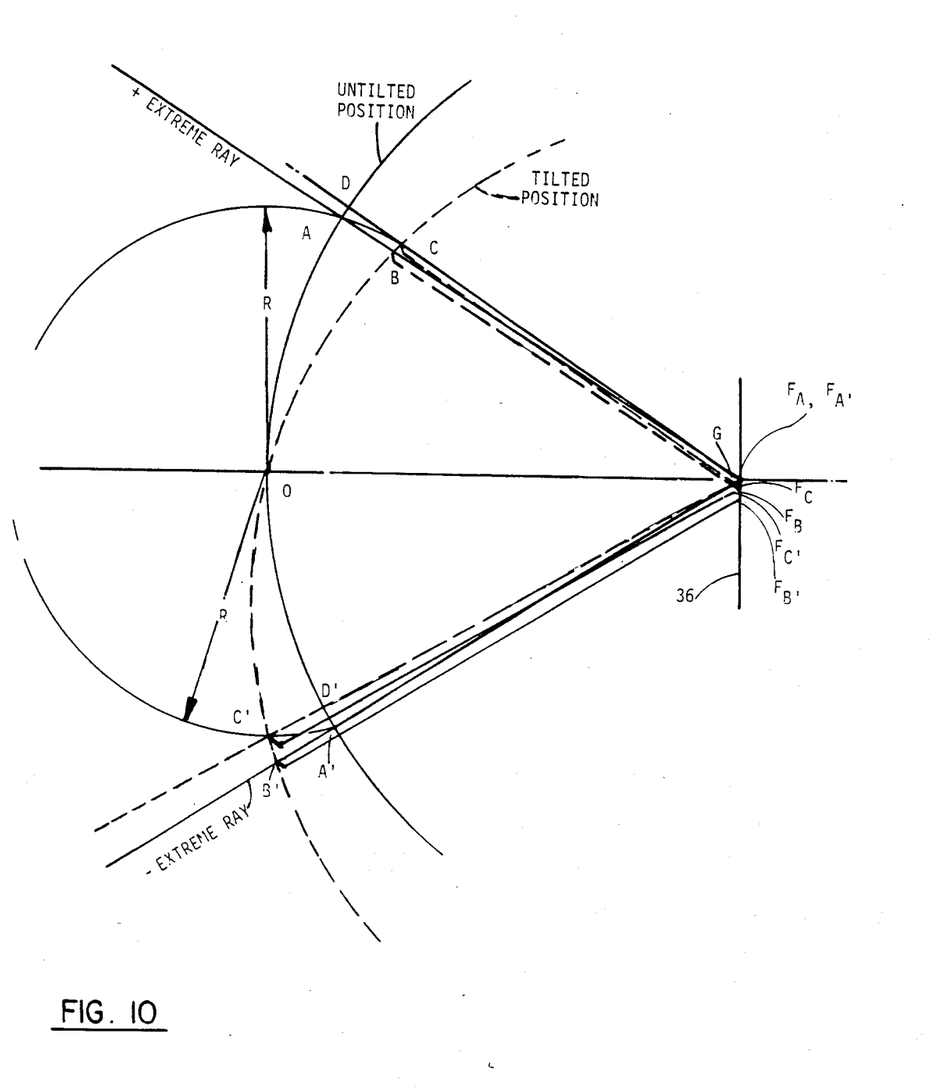
FIG. 10 is a schematic illustrating the operation of a meniscus lens in converging light rays.

FIG. 10 shows the operation of these small plano plates as forming a continuous surface in faster converging rays (smaller F No. optical system). For illustrative purposes, the plano plate is depicted without thickness; however, the ray bending effect of the material, and its thickness is indicated. Consider the Extreme Ray as it passes through the untilted small plano plate at Point A and continues on to Point $F_A$ on the optical axis at the image plane 36. Radius R is the distance OA and OA' which is the distance from the optical axis to the point on the untilted surface where the Extreme Ray strikes it.

When the meniscus lens is rotated (tilted) about the pivot axis at O, the distance OA (radius R) crosses the first surface of the series of plano plates at C. This point is at distance BC further from the pivot point "O" than point B where the + Extreme Ray impinges on the tilted first surface. The + Extreme Ray now impinges at an entrance angle that is not perpendicular to the tilted surface. The point of impingement at point B is now on a different incremental plano plate than for the untilted position. The ray passing through the small plano plate at point B is bent toward the normal in the lens and exits at an angle equal to the entrance angle. This + Extreme Ray crosses the optical axis forward of the image plane at point G, and intersects the image plane 36 at point $F_B$. Point C represents the same incremental small plano plate on which the +Extreme Ray was incident at point A for the untilted position. Point C receives light ray DC, at an angle with respect to the optical axis that is greater than the angle the + Extreme Ray angle strikes Point B. The combination of this greater angle of ray DC, and the more severely tilted small plano plate at C, as compared to B, deviates the light ray to point $F_C$ between the focal point $F_A$ and point $F_B$.

A similar phenomenon occurs with the corresponding rays on the other side of the optical axis. These corresponding rays are also bent toward the normal of the small plano plates, exit parallel to the incoming rays, and strike the image plane at points $F_B/$ and $F_C/$. It is apparent from the sketch in FIG. 10 that the negative "extreme" rays will not exactly coincide with the positive "extreme" rays previously described. In fact, it is apparent that the "extreme" rays (DC and C'/D') represent different (but nearby) points in the scene. The fact that the points don't coincide suggests that the focus has been degraded; however, the image has been shifted and the graphical result shown suggests that by using a meniscus lens, a substantial improvement over that obtained using the transmissive plano plate described above is possible. This improvement is possible because the optical designer has two surfaces that can be curved independently to minimize the out-of-focus condition. By definition, the surfaces of a plano parallel plate must be parallel.

By using the meniscus lens to replace the series of small incremental plano plates described above, lens equations, well known in the art, can be utilized to select first and second surface curvatures that are different, but which are tailored along with other parameters such as material, and thickness of the meniscus lens to achieve a lens design that minimizes the inherent "blurring" characteristics of the above described transmissive plano plate in a converging beam. The respective paramters for a particular design can then be rapidly itterated using one of several commercially available computer aided design programs to develop the prescription for an optical scanning system using a meniscus lens that preserves high quality imagery across the relatively flat focal plane. In practice, as with the preferred embodiment, it was found that the radius of curvature of the first surface of the meniscus lens had to have a considerably greater radius than the distance from the first surface to the focal point. For the best meniscus lens scanner design it is necessary to consider: (1) size of the field of view, (2) distance to the focal plane, (3) thickness and refractive index of the lens material, (4) the "F" number of the optical system, (5) the curvatures of the lens surfaces, (6) the displacement required in the focal plane, and (7) the image quality required in the focal plane. Altering the curvatures of both the front and rear surfaces of the meniscus lens and changing its width can be used to correct spherical type abberations, adjust chromatic abberations, and create a nearly in-focus condition across the focal plane.

Achieving this infocus condition, as described above, requires the use of modern computer modeling and iterative processes in ray tracing as is customary, in practice, when using optical optical design programs, and analytical techniques to determine the appropriate lens material, thickness, surface, prescriptions and configurations necessary to satisfy each specific set of optical system design requirements.

Accordingly, there has been described a linear optical scanner for scanning an image on an image plane. Although the invention has been disclosed and illustrated in detail, it is to be clearly understood that the same is by way of illustration and example only and is not be be taken by way of limitation, the spirit and scope of this invention being limited only by the terms of the appended claims.

What is claimed is:

1. A converging beam linear optical scanning system adapted to receive essentially collimated light rays from object space, the light rays passing through the converging beam linear optical scanning system in image forming relation, to form an image on a relatively flat image plane, said optical scanning system being adapted to converge and focus the collimated rays and to periodically and reciprocally displace the image on said relatively flat image plane, said converging beam linear optical scanning system comprising:

an objective lens system for receiving essentially collimated light rays from object space and for converging said essentially collimated light rays along an optical axis to form a relatively flat image field on said relatively flat image plane; the optical axis of said objective lens system being incident on said relatively flat image plane;

a meniscus lens having a vertex, said optical axis passing through said vertex, said meniscus lens being shaped to have essentially zero optical power;

means for supporting and gimballing said meniscus lens on at least a first pivot axis, said first pivot axis being orthogonal to said objective lens optical axis and positioned to cross said optical axis between said objective lens and said image plane, said meniscus lens position being selected to have said meniscus lens receive the converging light rays from said objective lens system and to transmit said converging light rays to said relatively flat image plane;

means for periodically and reciprocally oscillating said meniscus lens through a reciprocal predetermined pivotal angular displacement on at least said first pivot axis, said means for oscillating said meniscus lens being coupled to said means for supporting and gimballing said meniscus lens;

whereby, said image is periodically and linearly displaced on said relatively flat image plane, said image linear displacement corresponding in distance and time to said meniscus lens oscillating first pivotal angle on said first pivot axis.

2. The combination of claim 1, wherein said objective lens system is a refractive objective lens system for forming a relatively flat field.

3. The combination of claim 1, wherein said objective lens system is a reflective objective system for forming a relatively flat field.

4. The combination of claim 1, wherein said objective lens system is a catadioptric objective lens system for forming a relatively flat field.

5. The combination of claim 1, wherein said first pivot axis is orthogonal to said optical axis, said first pivot axis passing through said vertex.

6. The combination of claim 1, wherein said meniscus lens has a first and second curved surface; said first and second curved surfaces having a first and second radius of curvature respectively; said means for positioning said meniscus lens between said objective lens and said relatively flat image plane being adapted to position said meniscus lens first surface to receive said converging light rays from said objective lens system, and to position said meniscus lens second surface to transmit said converging light rays to said relatively flat image plane; said meniscus lens being adapted to form said relatively flat field on said flat image plane with minimized degradation of optical resolution.

7. The combination of claim 6 wherein said first and second radius of curvature is positive, each first and second radius of curvature being measured from a respective first and second center of radius of curvature to the respective first and second curved surface, each respective center of radius of curvature being positioned at a point on the optical axis of said objective lens system behind said relatively flat image plane.

8. The combination of claim 1, wherein said means for pivoting said meniscus lens further comprises a pivot axis, said pivot axis being transverse to said optical axis.

9. The combination of claim 1, wherein said means for pivoting said meniscus lens further comprises a gimbal with orthogonal axes yielding two orthogonal pivot axes perpendicular to and intersecting said optical axis; whereby, said meniscus lens is adapted to oscillate about at least one of said two orthogonal axes; thereby linearly displacing said relatively flat image field on said relatively flat image plane in a predetermined pattern.

10. The combination of claim 1, wherein said means for positioning said meniscus lens between said objective lens and said image plane further comprises a frame, said frame being adapted to hold said meniscus lens in coaxial alignment with said optical axis passing through said meniscus lens vertex, said frame further comprising means for pivoting said meniscus lens on a first pivot axis, said first pivot axis being orthogonal to said optical axis.

11. The combination of claim 1 wherein said meniscus lens is fabricated from Germanium, Ge.

12. The combination of claim 1 wherein said meniscus lens is fabricated from Silicon, Si.

13. The combination of claim 1 wherein said meniscus lens is fabricated from Sapphire, $Al_2O_3$.

14. The combination of claim 1 wherein said meniscus lens is fabricated from Zinc Sulfide, ZnS.

15. The combination of claim 1 wherein said meniscus lens is fabricated from Zinc Selinide, ZnSe.

16. The combination of claim 1 wherein said meniscus lens is fabricated in accordance with the following prescription:

| SURFACE | REMARKS | RADIUS (INCHES) | THICKNESS ($t_n$) (INCHES) | MATERIAL |
| --- | --- | --- | --- | --- |
| 11 | MENISCUS LENS | 8.350 | $t_5 = 0.10$ | ZnSe |
| 12 |  | 8.000 |  |  |

* * * * *